Patented Aug. 16, 1938

2,126,794

UNITED STATES PATENT OFFICE 2,126,794

RESINOUS COMPOSITIONS

Walter R. Marshall, Bloomfield, N. J., assignor to Bakelite Corporation, New York, N. Y., a corporation of Delaware No Drawing. Application March 27, 1936, Serial No. 71,332

10 Claims. (Cl. 260—2)

This invention relates to new resinous compositions and a method of making the compositions.

The new resinous compositions are reaction products of the halides of aromatic dibasic acids, such as o-phthalyl chloride or bromide with alkyl or aralkyl esters of aromatic hydroxy-carboxylic acids, such as o- and p-hydroxy benzoic acid.

The new resinous materials are typically produced by reacting together the chloride of the aromatic dibasic acid and the ester of the aromatic hydroxy-carboxylic acid preferably at above 100° C. until the evolution of hydrogen chloride ceases. The product is then advantageously heated under vacuum at a relatively high temperature, for example, about 200°–300° C., to remove from the reaction product unreacted substances, by-products and undesirable constituents. The resultant products are tough, solid or viscous, resin-like substances, which do not readily crystallize. They are practically insoluble in ethyl alcohol at 20° C. They are insoluble in sodium carbonate and caustic soda solutions and do not change in color when treated with sodium carbonate and caustic soda.

For example, two mols (304 grams) of methyl salicylate and one mol. (203 grams) of commercial o-phthalyl chloride are heated together in a flask fitted with an air reflux condenser. When evolution of hydrogen chloride commences normally at 130° to 150° C., the rate of heating is moderated and the reaction mixture is brought to a temperature of 225° to 250° C. in one to two hours.

The reaction may be accelerated by the addition of a catalyst such as copper or cuprous chloride. The reaction may also be effected by adding the o-phthalyl chloride at a controlled rate to the methyl salicylate while the latter is maintained at a temperature at which the reaction takes place, or vice versa.

The flask is then arranged for distillation and vacuum is applied with continued heating. Some unreacted methyl salicylate distills over at first and later phthalic anhydride is removed. Typically the salicylic ester recovered amounts to 10 to 16% of that originally added to the reaction, and the phthalic anhydride amounts to 28 to 30% of its equivalent of the phthalyl chloride used. The distillation is preferably stopped when the temperature of the resin in the flask reaches about 300° C. at 5 to 15 millimeters' pressure.

The resulting product amounts to about 75–80% of the theoretical yield based on the reaction:

o—C$_6$H$_4$(COCl)$_2$ + 2o—OHC$_6$H$_4$COOCH$_3$ — 2HCl

The product is a pale yellowish, rather hard, tough resin-like material at room temperature and melts at 135° to 155° F. (using a modified A. S. T. M. ball and ring method of determining resin melting points by which W. W. rosin melts at 174° F.). Its acid number is low, typically 1–2. It is soluble in acetone, alkyl acetates, benzol, toluol, xylol, ethyl lactate, tricresyl-phosphate and mixed lacquer solvents. It is sparingly soluble or miscible hot, but precipitated cold in paraffin hydrocarbons, alcohols, glycol, glycerol, tung oil and linseed oil. It is insoluble in sodium carbonate and caustic soda solutions and exhibits no color change when treated therewith at ordinary temperatures.

In place of the methyl ester, other alkyl, aryl, or aralkyl esters of salicylic acid may be used, for example, the ethyl, butyl and benzyl esters.

It is advantageous for many purposes to replace one mol. of the methyl salicylate in the above-described reaction by one mol. of a phenol, for example, phenol itself or the alkylated and/or arylated phenols. When phenol is used as a component the evolution of hydrochloric acid begins at a temperature considerably lower than that given in the foregoing example.

The new resinous products are particularly adapted for the production of coating and molding compositions, including cellulose esters, such as cellulose nitrate and cellulose acetate, cellulose ethers, such as benzyl cellulose, vinyl esters, such as vinyl acetate, and vinyl chloride or mixtures thereof, aldehyde derivatives of vinyl esters, such as are marketed under the trade names of Formvar and Alvar and/or alkyd or modified alkyd resins and other resinous substances.

Coating compositions made in accordance with the invention are characterized by improved light and alkali resistance. When used in lacquers in combination with nitrocellulose, it is not necessary that low viscosity nitrocellulose be used, as it is possible to produce with the use of the resinous products of the invention a good film in a single coat with nitrocellulose of relatively high viscosity, for example, 8 seconds.

This application is a continuation-in-part of my application Serial No. 731,990, filed June 22, 1934.

I claim:

1. A resinous reaction product of a halide of an aromatic dicarboxylic acid and an ester of an aromatic hydroxy carboxylic acid characterized by insolubility in alkaline solutions.

2. A resinous reaction product of o-phthalyl chloride and methyl salicylate characterized by insolubility in alkaline solutions.

3. A resinous reaction product of a chloride of an aromatic dicarboxylic acid, an ester of an aromatic hydroxy carboxylic acid and a phenol other than said ester, characterized by insolubility in alkaline solutions.

4. A resinous reaction product of o-phthalyl chloride, phenol and methyl salicylate characterized by insolubility in alkaline solutions.

5. The method of making a resinous product which comprises heating together a halide of an aromatic dicarboxylic acid and an ester of an aromatic hydroxy carboxylic acid at a temperature of at least 100° C.

6. The method of making a resinous product which comprises heating together o-phthalyl chloride and methyl salicylate at a temperature of at least 100° C.

7. The method of making a resinous product which comprises heating together a chloride of an aromatic dicarboxylic acid, an ester of an aromatic hydroxy carboxylic acid and a phenol other than said ester at a temperature of at least 100° C.

8. The method of making a resinous product which comprises heating together o-phthalyl chloride, phenol and methyl salicylate at a temperature of at least 100° C.

9. The method of making a resinous product which comprises heating o-phthalyl chloride and methyl salicylate to about 225° to 250° C. until the evolution of hydrogen chloride ceases.

10. The method of making a resinous product which comprises heating o-phthalyl chloride, phenol and methyl salicylate to about 225° to 250° C. until the evolution of hydrogen chloride ceases.

WALTER R. MARSHALL.